United States Patent
Girishankar et al.

(10) Patent No.: US 10,951,553 B2
(45) Date of Patent: Mar. 16, 2021

(54) UPDATABLE MESSAGE CHANNELS/TOPICS FOR CUSTOMER SERVICE INTERACTION

(71) Applicant: Freshworks Inc., San Bruno, CA (US)

(72) Inventors: Vignesh Girishankar, Chennai (IN); Siddharth Gopalasundaram, Coimbatore (IN); Hrishikesh Premkumar, Chennai (IN); Prasannan Narayanasamy, Chennai (IN); Govind Patel, Chennai (IN); Deepak Balasubramanyam, Chennai (IN)

( * ) Notice: Subject to any disclaimer, the term of this patent is extended or adjusted under 35 U.S.C. 154(b) by 0 days.

(21) Appl. No.: 16/192,726

(22) Filed: Nov. 15, 2018

(65) Prior Publication Data

US 2019/0089657 A1      Mar. 21, 2019

Related U.S. Application Data

(62) Division of application No. 15/594,305, filed on May 12, 2017, now Pat. No. 10,541,948.

(51) Int. Cl.

| | |
|---|---|
| *H04L 12/58* | (2006.01) |
| *H04M 1/725* | (2006.01) |
| *H04W 4/20* | (2018.01) |
| *H04W 4/06* | (2009.01) |
| *G06Q 30/00* | (2012.01) |
| *G06Q 10/06* | (2012.01) |
| *H04L 29/08* | (2006.01) |
| *H04W 80/12* | (2009.01) |
| *H04W 4/02* | (2018.01) |

(52) U.S. Cl.
CPC ........ *H04L 51/02* (2013.01); *G06Q 10/06311* (2013.01); *G06Q 30/016* (2013.01); *H04L 51/16* (2013.01); *H04L 67/26* (2013.01); *H04M 1/72552* (2013.01); *H04M 1/72586* (2013.01); *H04W 4/06* (2013.01); *H04W 4/20* (2013.01); *H04L 51/04* (2013.01); *H04W 4/02* (2013.01); *H04W 80/12* (2013.01); *Y04S 10/50* (2013.01)

(58) Field of Classification Search
CPC ......... H04L 51/02; H04L 51/16; H04L 51/54; H04L 67/26; G06Q 10/06311; G06Q 30/016; H04M 1/725552; H04M 1/72586; H04W 4/06; H04W 4/20; H04W 4/02; H04W 80/12

See application file for complete search history.

(56) References Cited

U.S. PATENT DOCUMENTS

| | | |
|---|---|---|
| 7,346,576 B2 | 3/2008 | Lent et al. |
| 8,117,553 B2 * | 2/2012 | Danninger ............ G06F 16/957 715/764 |
| 8,713,117 B2 | 4/2014 | Downes et al. |

(Continued)

OTHER PUBLICATIONS

Todd L Barker, "Final Office Action", dated May 15, 2019, U.S. Appl. No. 15/594,305.

(Continued)

*Primary Examiner* — Todd L Barker
(74) *Attorney, Agent, or Firm* — LeonardPatel PC

(57) ABSTRACT

A computer-implemented process for displaying one or more message channels may include arranging the one or more message channels for a user of a computing system to view. Each of the one or more message channels may include a message channel icon, a message channel name, a message, a timestamp of the message, and a badge number.

16 Claims, 9 Drawing Sheets

(56) References Cited

U.S. PATENT DOCUMENTS

| | | | | |
|---|---|---|---|---|
| 8,726,305 | B2* | 5/2014 | Jacoby | H04N 21/431 |
| | | | | 725/25 |
| 8,930,839 | B2* | 1/2015 | He | G06F 3/04817 |
| | | | | 715/765 |
| 9,203,796 | B2 | 12/2015 | Hsiao et al. | |
| 10,021,059 | B1* | 7/2018 | Rao | H04L 51/10 |
| 10,187,337 | B2* | 1/2019 | Smullen | H04L 67/02 |
| 2005/0100113 | A1* | 5/2005 | Corts | H04H 20/30 |
| | | | | 375/295 |
| 2009/0100371 | A1 | 4/2009 | Hu | |
| 2011/0154200 | A1* | 6/2011 | Davis | H04N 21/8133 |
| | | | | 715/716 |
| 2011/0314111 | A1* | 12/2011 | Wang | G06Q 10/10 |
| | | | | 709/206 |
| 2012/0096410 | A1* | 4/2012 | Lancaster | G06F 16/9577 |
| | | | | 715/854 |
| 2012/0278115 | A1* | 11/2012 | Acharya | G06Q 30/02 |
| | | | | 705/7.13 |
| 2013/0282417 | A1* | 10/2013 | Gaedcke | G06Q 30/016 |
| | | | | 705/7.13 |
| 2014/0307863 | A1 | 10/2014 | Snyder et al. | |
| 2016/0104215 | A1 | 4/2016 | Cist et al. | |
| 2016/0349960 | A1* | 12/2016 | Kumar | G06F 3/04817 |
| 2017/0180284 | A1* | 6/2017 | Smullen | H04L 63/18 |
| 2018/0095612 | A1* | 4/2018 | Rapp | G06F 3/04817 |

OTHER PUBLICATIONS

"Always Be Support Ready" found at http://customer360.co/360mobi/360mobi-for-enhanced-chat-management/, accessed on May 11, 2017.

"Applozic" found at https://www.applozic.com/features.html, accessed on May 11, 2017.

"Auto-Assigning Tickets to Agents in a Group" found at https://support.freshservice.com/support/solutions/articles/157134-auto-assigning-tickets-to-agents-in-a-group, access on May 11, 2017.

"HelpCrunch" found at http://helpcrunch.com.

"LiveChat" found at https://www.livechatinc.com/features, accessed on May 11, 2017.

"Meet Customers Where They Are" found at https://www.salesforce.com/assets/pdf/misc/DS_meet_customers_where_they_are.pdf, accessed on May 11, 2017.

"Talkus.io" found at https://www.talkus.io/, accessed on May 11, 2017.

"Ticket Auto Assign" found at https://www.manageengine.com/products/service-desk/help-desk-load-balancing.html, accessed on May 11, 2017.

"Userlike-Live Chat" at https://www.userlike.com/en/features, accessed on May 11, 2017.

"Where Tasks Manage Themselves" found at http://customer360.co/helpdesk-features/enhance-customer-engagement-with-task-management/, accessed on May 11, 2017.

"ZenDesk" found at https://support.zendesk.com/hc/en-us/articles/203662266-Monitoring-ticket-activity-and-agent-performance-with-reports, accessed on May 11, 2017.

Ruey-Shiang Shaw et al. "A Study of the Application of Ontology to an FAQ Automatic Classification System", the abstract found at http://dl.acm.org/citation.cfm?id=2240626, and accessed on May 12, 2017.

Todd L Barker, "Restriction Requirement", dated Oct. 17, 2018, U.S. Appl. No. 15/594,305.

Freshdesk, "API Reference Beta", Jan. 14, 2016.

Todd L Barker, "Non-Final Office Action", dated Nov. 14, 2018, U.S. Appl. No. 15/594,305.

Todd L Barker, "Notice of Allowance", dated Oct. 2, 2019, U.S. Appl. No. 15/594,305.

* cited by examiner

UPDATABLE MESSAGE CHANNELS/TOPICS FOR CUSTOMER SERVICE INTERACTION

CROSS-REFERENCE TO RELATED APPLICATION

This application is a divisional of, and claims the benefit of, U.S. patent application Ser. No. 15/594,305, filed on May 12, 2017, which claims priority to, and the benefit of, Indian Patent Application No. 201741003057, filed on Jan. 27, 2017. The subject matter thereof is hereby incorporated herein by reference in its entirety.

FIELD

Embodiments of the present invention generally pertain to in-application (hereinafter "in-app") messaging (or chat), and more particularly, to presenting one or more topic-based channels (or threads) for one-way or two-way messaging.

BACKGROUND

In in-app customer support, a customer query is often triaged manually by a supervisor. For instance, the supervisor may determine the priority of the query and then assign the query to the appropriate agent and/or agent group. This, however, is not the most efficient and fastest way to manage queries.

There are systems that route the messages within a chat using metadata, or in some cases, by analyzing the message content. But, it is not possible for the system to predict the user's current problem. There are also systems that force the user to select a category before starting a conversation. This, however, creates a burden on the user. For example, by forcing the user to select a category, the user is faced with taking an extra step. This may also prevent the user from continuing a previous conversation if needed, since there is usually one chat thread at a time.

Thus, an alternative in-app messaging technique may be beneficial.

SUMMARY

Certain embodiments of the present invention may provide solutions to the problems and needs in the art that have not yet been fully identified, appreciated, or solved by current messaging and/or chat systems. For examples, some embodiments generally pertain to an in-app messaging system that creates and/or updates topics and routing rules as business requirements evolve. This may include creating a new version of a mobile app and allowing users to update his or her app before the changes reflect. Consequently, the in-app messaging system may allow the users to easily select a topic start a conversation. This conversation may then be routed to the appropriate agent group, and in some embodiments, to the appropriate agent within an agent group, in the most efficient manner. This may also allow businesses to easily manage the conversations or in-app messages without the need to update the apps.

In one embodiment, a computer-implemented process for displaying one or more message channels within an application. The process may include arranging the one or more message channels for a user of a computing system to view. Each of the one or more message channels comprise a message channel icon, a message channel name, a message, a timestamp of the message, and a badge number.

In another embodiment, a computer-implemented process for managing message channels may include receiving, at a server, a list of message channels from a dashboard of an admin device. The method may also include pushing, from the server, the list of message channels to one or more client devices in response to a query from the one or more client devices. The list of message channels identifies one or more topics for the user of the one or more client devices to select in order to connect with an agent or a BOT.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
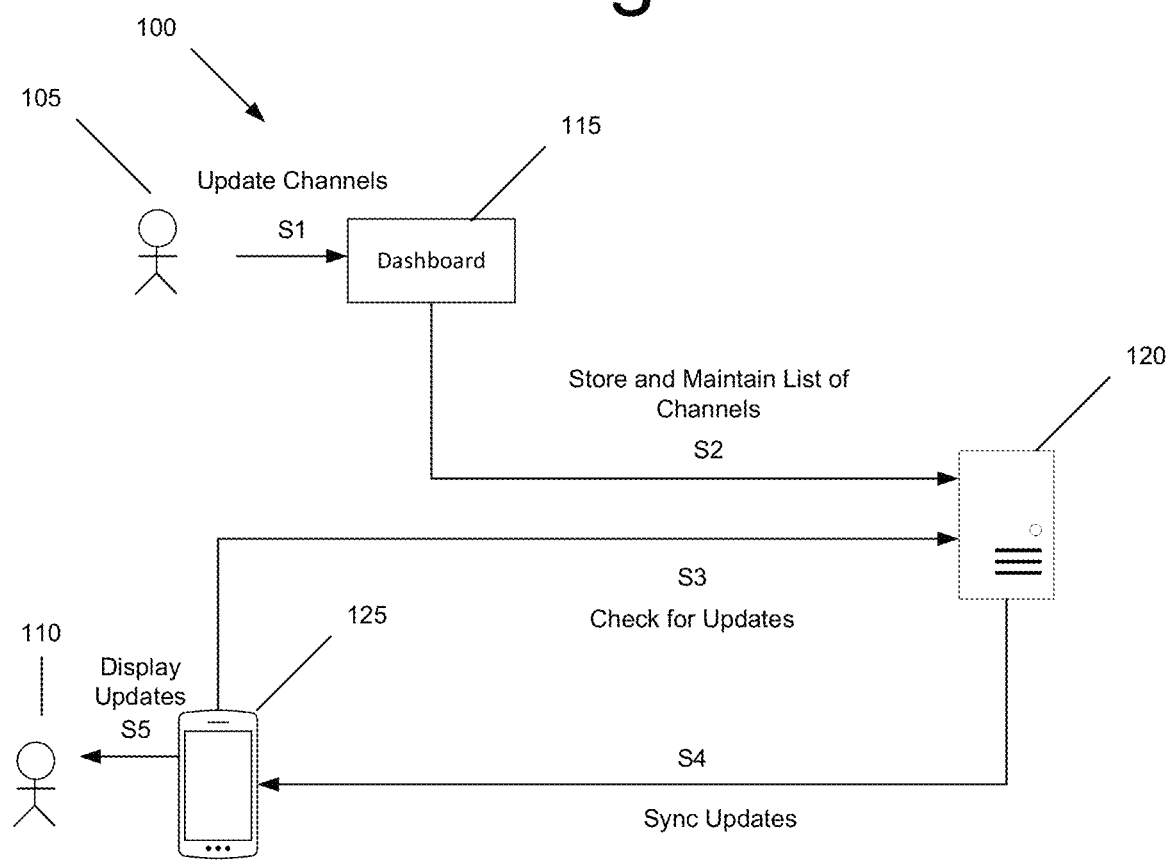
FIG. 1 is a sequence diagram illustrating a message channel architecture for updating one or more message channels, according to an embodiment of the present invention.

Some embodiments generally pertain to message channels (hereinafter "channels"). Channels (or topics in some embodiments) may be used for broadcast messaging to a target audience, or in some embodiments, for initiating a conversation between a customer support agent (hereinafter "agent") and a customer (e.g., a user of the client device). The topics may be one-way broadcast channels or two-way chat channels. Channels may be pre-configured, configured and/or updated by an administrator (hereinafter "admin"). For example, the admin may access a dashboard, which may be an application on a computing device or a web-based interface, and create new channels or make changes to the existing channels using the dashboard. In certain embodiments, an agent may create a new channel and/or make changes to the existing channels. The new channels or changes are stored on a central server(s), and may propagate to all client devices when accessed.

Channels may include, but are not limited to, the following: (1) routing, (2) prioritization, and (3) enhancement of customer experience. For example, channels may decrease the time to route a customer to the agent. This way, the most qualified agent may focus on the right set of issues or conversation to resolve the issue faced by the customer.

Channels may help with prioritizing a message from the user to the agent to decrease the time for an agent to resolve the issue faced by the user. For example, channels with higher priority may be assigned to a different set of agents or may have groups with more agents mapped to them. In another example, an agent may look at the channel name, and may decide which conversation he or she wants to respond to quickly. In certain embodiments, assignment rules may exist to map certain channels to agents that are equipped to handle the issue. Also, in certain embodiments, the assignment rules may showcase the high priority conversations with a focus on identifying priority messages in the agent's interface or filter out high priority messages.

By prioritizing messages, an agent may determine the priority (or urgency) of the message without reading every message in the conversation and may act accordingly. In some embodiments, the message may be prioritized based on the topic. The topic may be selected by the user, for example. Depending on the embodiment, the topic (or channel) may be available to certain users, such as VIP users, or user that have an active transaction.

Channels may also set a customer expectation, e.g., provide the customer with a better estimate for resolving the issue. For example, by using a specific welcome message within the one or more channels, the user is able understand the type of query or queries that the user may be assisted with and the estimated response time for the query or queries. Each channel may also provide the user with a status, e.g., the availability of the business, e.g., whether the business is offline or online, and the expected time when the business will be online and with a response. Each channel may further provide the user with details of an alternative contact such as a phone number for urgent issues.

FIG. 1 is a sequence diagram illustrating a message network architecture 100 for updating one or more message channels, according to an embodiment of the present invention. In this embodiment, message channel architecture 100 includes a dashboard 115 that may be accessed by an admin 105. The dashboard may be available through an application or a web-based interface on an admin computing device. Message channel architecture 100 also includes a centralized server (or server) 120, which may be part of a group of servers in some embodiments, and may host dashboard 110. Server 120 may include at least one processor, memory comprising one or more modules, a communication unit to communicate with the user and admin, etc.

Message channel architecture 100 further includes a client device 125 that can view the one or more channels through a mobile application or a web-based application. Although a mobile device is depicted in FIG. 1, one of ordinary skill in the art will readily appreciate that any suitable type of computing device may be used to access the application and interact with the agent without deviating from the scope of the invention. It should be appreciated that the message channel application accessed by user 110 may be a stand-alone application or integrated within another application as part of a standard development kit (SDK).

In the embodiment shown in FIG. 1, to set up or update channels, admin 105 may access dashboard 110 using an application or a web-based interface at S1. At S2, central server(s) 120, which stores and maintains a list of the message channels, may update the list of message channels. Client device 125 may query at S3 server 120 to determine (or check) if the message channel list has been updated. Depending on the embodiment, client device 125 may automatically check for updates after a predefined period of time has elapsed (e.g., every 5 minutes) or may be triggered by the user's action. In FIG. 1, since the message channel list has been updated, server 120 in response to the query may push (or send) to client device 125 the updated message channel list at S4. This way, client device 125 can download or sync the updated channel list. At S5, client device 125 may display the updated message channel list.

Figure 2:
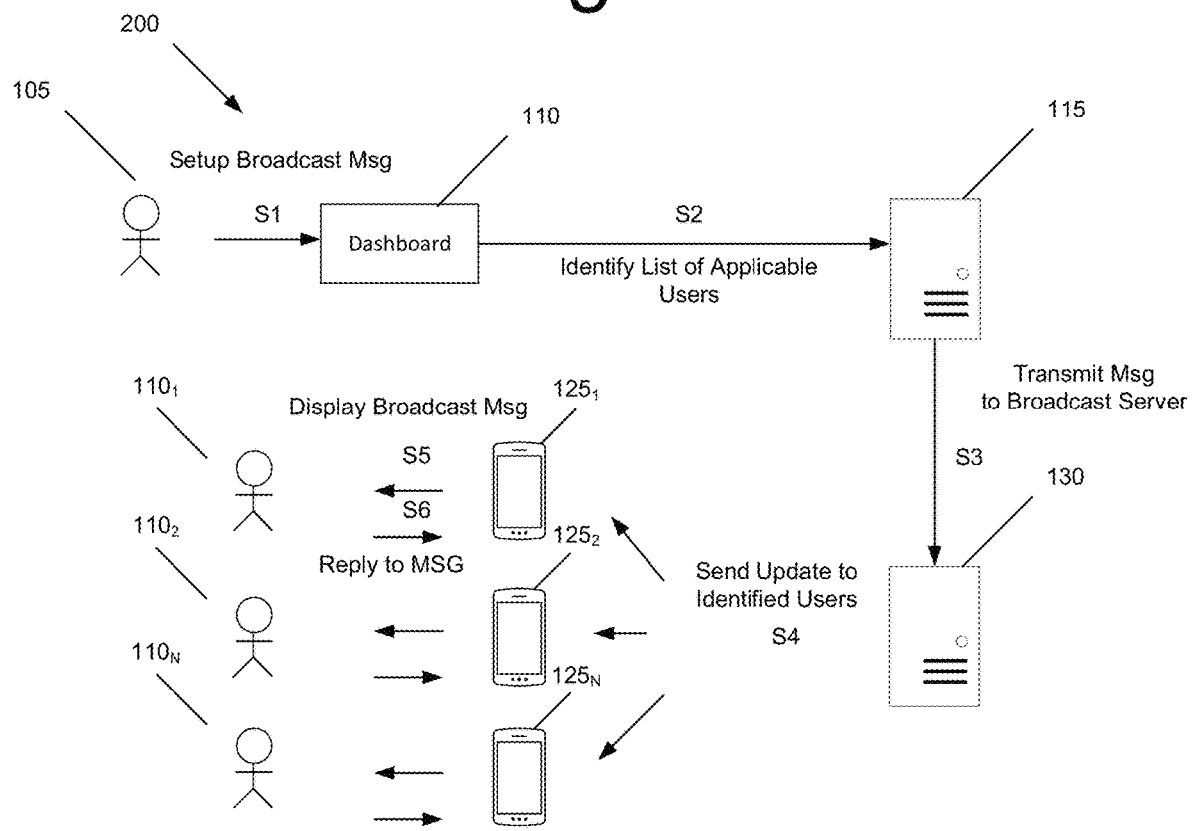
FIG. 2 is a sequence diagram illustrating a message channel architecture for broadcasting a message under a particular message channel, according to an embodiment of the present invention.

FIG. 2 is also a sequence diagram illustrating a message channel architecture 200 for automatically broadcasting a message under a particular message channel, according to an embodiment of the present invention. In this embodiment, an administrator 105 accesses dashboard 110 to set up a broadcast message under a particular message channel at S1. The particular message may be under a channel associated with user criteria. At S2, server 115 identifies the list of applicable users $110_1 \ldots 110_N$, including the list of associated client devices $125_1 \ldots 125_N$, based on the criteria. The criteria may include rules that are matched against all users of the application. These rules may include usage criteria (e.g., when the user started using the application, number of times the user opened the application, etc.), application/device criteria (e.g., application version, operating system version, device model, etc.), or custom properties (e.g., any key value pairs captured by the application—gender, age, location, user type, etc.). The criteria may be a "equal to", "not equal to", "is set", "not set" type check, or a "less than", "greater than" check in case the captured value is a number.

At S3, server 115 sends the broadcast message, including the list of identified users $110_1 \ldots 110_N$, to broadcast server 130. At S4, broadcast server 130 transmits (or sends) the update message to the identified user $110_1 \ldots 110_N$ for display at S5 by client device $125_1 \ldots 125_N$. In response, at S6, client device $125_1 \ldots 125_N$ may respond to the broadcast message when the response is inputted and/or by identified user $110_1 \ldots 110_N$.

In some other embodiments, broadcast server 130 may send the message, including any notifications, to identified users $110_1 \ldots 110_N$. For example, broadcast server 130 may deliver a marketing job, as well as retry delivery of the marketing job if the marketing job is halted for any reason. Client devices $125_1 \ldots 125_N$ may respond to indicate it received the message, and indicate that identified users $110_1 \ldots 110_N$ has viewed the message. This may help keep track of analytics around the broadcast message.

Although FIG. 2 shows one-way communication for broadcast messages, certain embodiments may allow for two-way communication. For example, messages may be communicated between dashboard 110, server 115, broadcast server 130, and client devices $110_1 \ldots 110_N$.

Figure 3:
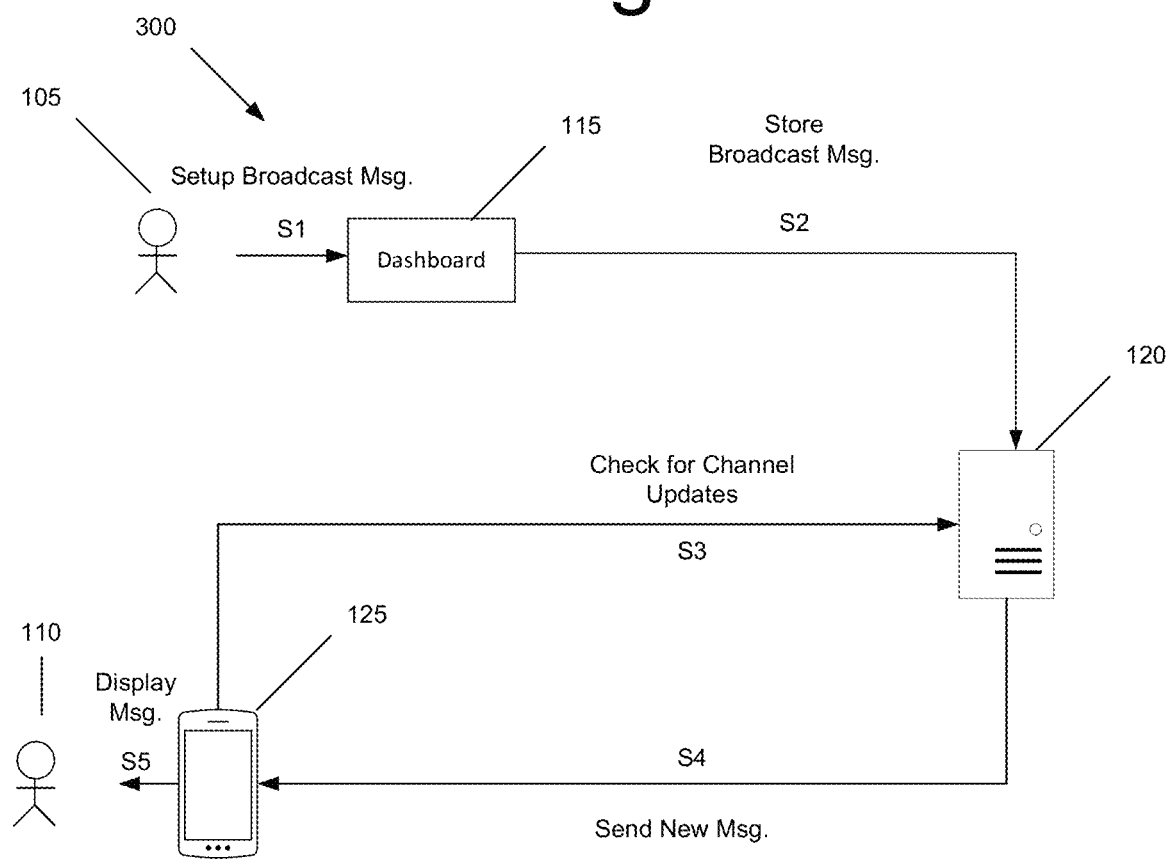
FIG. 3 is a sequence diagram illustrating a message channel architecture for broadcasting a message under a particular message channel, according to an embodiment of the present invention.

FIG. 3 is a sequence diagram illustrating a message channel architecture 300 for broadcasting a message for a particular message channel, according to an embodiment of the present invention. In this embodiment, admin 105 may access dashboard 115 to set up a broadcast message for a particular channel at S1. At S2, the broadcast message for the particular channel is stored in server 120. At S3, user 110 may access a messaging app on client device 125 to check for message channel updates under a selected channel at server 120. In an alternative embodiment, the message channel updates check may be for one or more selected or unselected message channels. The channel updates may include new messages under one or more channels, which may be created by admin 105 or an agent (not shown) and stored at server 120. Since there is an updated message (or new message) in this embodiment, server 120 at S4 sends the new message under the selected message channel, and is displayed by client device 125 at S5 for the user 110 to view.

Figure 4:
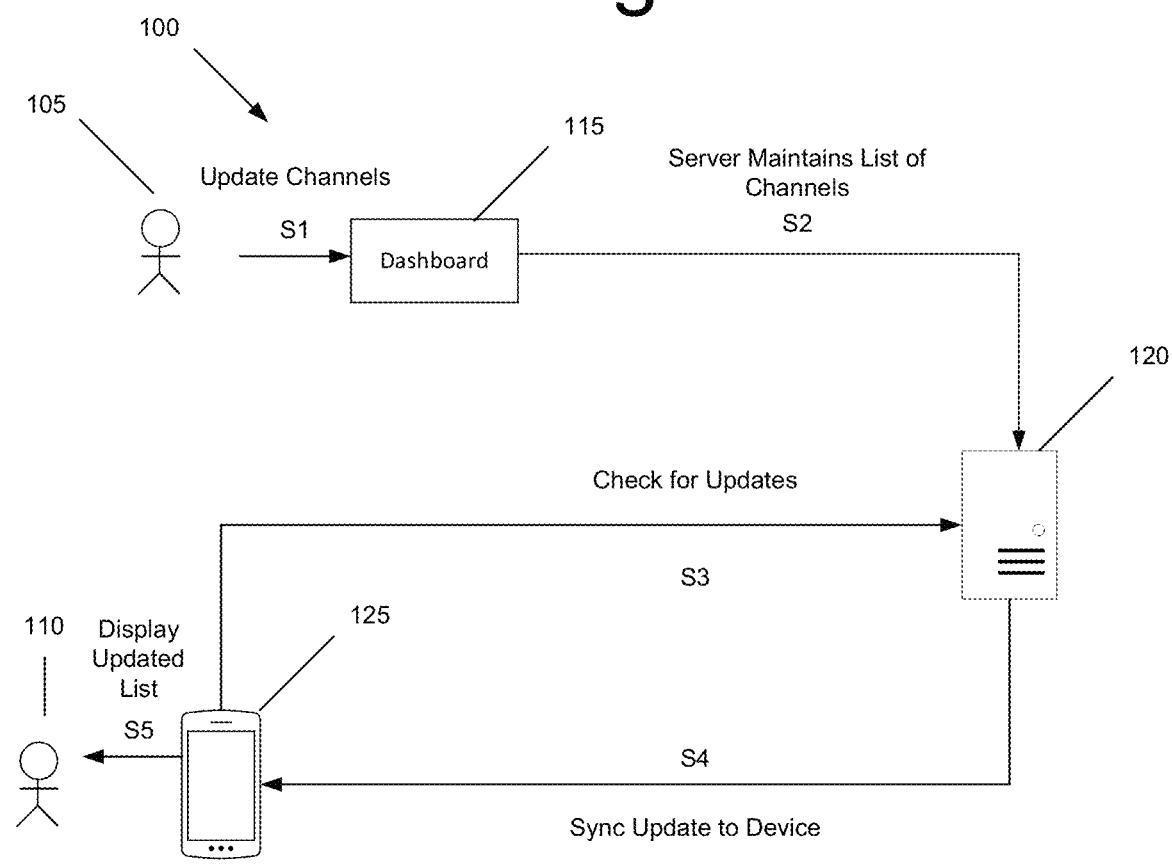
FIG. 4 is a sequence diagram illustrating a message channel architecture for updating one or more message channels, according to an embodiment of the present invention.

FIG. 4 is a sequence diagram illustrating a message channel architecture 400 for updating one or more message channels, according to an embodiment of the present invention. In this embodiment, admin 105 accesses dashboard 115 to update the channels at S1. The updates to the list of channels are received and maintained by server 120 at S2. At S3, client device 125 queries server 120 for updates, and at S4, the updates are synced or downloaded to client device 125. At S5, once the syncing is complete, client device 125 may display the updated list of the channels to user 110.

Figure 5:
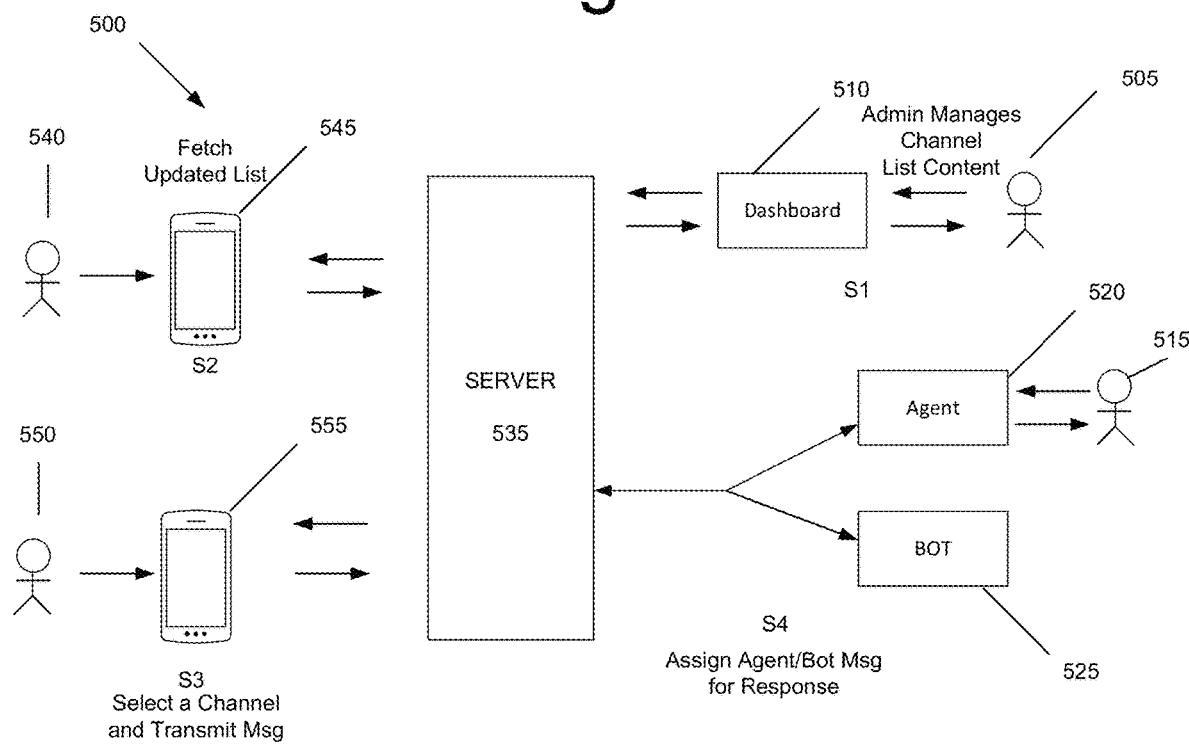
FIG. 5 is a sequence diagram illustrating a message channel architecture for two-way communication, according to an embodiment of the present invention.

FIG. 5 is a sequence diagram illustrating a message channel architecture 500 for two-way communication, according to an embodiment of the present invention. In this embodiment, admin 505 accesses dashboard 510 to manage channel list content at S1. Channel list content may include metadata on one or more channels for the account. This may include channel name, icon, description, whether the channel is enabled or disabled, tags for the channel, whether the channel is to be restricted (e.g., shown when requested to be shown more explicitly), etc. Simply put, any changes to the channel list content may be stored in server 535.

Tags may be used in some embodiments to filter channels depending on the context of the channel. For example, an admin may initially define or redefine at a later time a tag for each channel. An application developer for a particular application may then set the context for which channels are displayed depending on where the user is in the application. This may allow a user may see one or more channels depending on where the user is in the application. In embodiments where there is a single channel with a specific tag, then the user may be taken directly to that channel. Further, these tags may be hidden from the user in certain embodiments.

In some embodiments, context may show where the user is in the application, and the type of user he or she is, e.g., premium user or regular user. For example, assuming the application is for a ride sharing service. In such an application, the driver and the passenger, both of which have access to the application, may have different sets of tags assigned. A similar example may be applied to a restaurant application. In this example, the delivery service may have a different set of tags assigned in the application than the consumer. Simply put, the tags may filter one or more channels, allowing the user to only view those channels that are pertinent to him or her. This way, usability of the application is improved.

At S2, client device 545 may fetch and display for user 540 to view the updated channel list content. In some embodiments, client device 545 may fetch the updated channel list content, including any modifications to the content itself, automatically. In other embodiments, client device 545 may submit a query server 535 for the updated channel list content and may receive the updates in response to the query.

As shown in FIG. 5, user 550 may compose a message, which may include text, image, audio, and/or video, on client device 555. At S3, client device 555 sends the composed message to server 535. At S4, server 535 may store the composed message and assign the composed message to agent device 520 or BOT 525, allowing agent 515 or BOT 525 to respond to, or chat with, user 550. The assignment may be based on the selected channel under which the message was composed by user 550. In certain embodiments, the composed message may initially be assigned to BOT 525. When BOT 525 determines that a conversation or communication with user 550 is no longer feasible, BOT 525 transfers or reassigns the communication to agent device 520 and agent 515.

Figure 6:
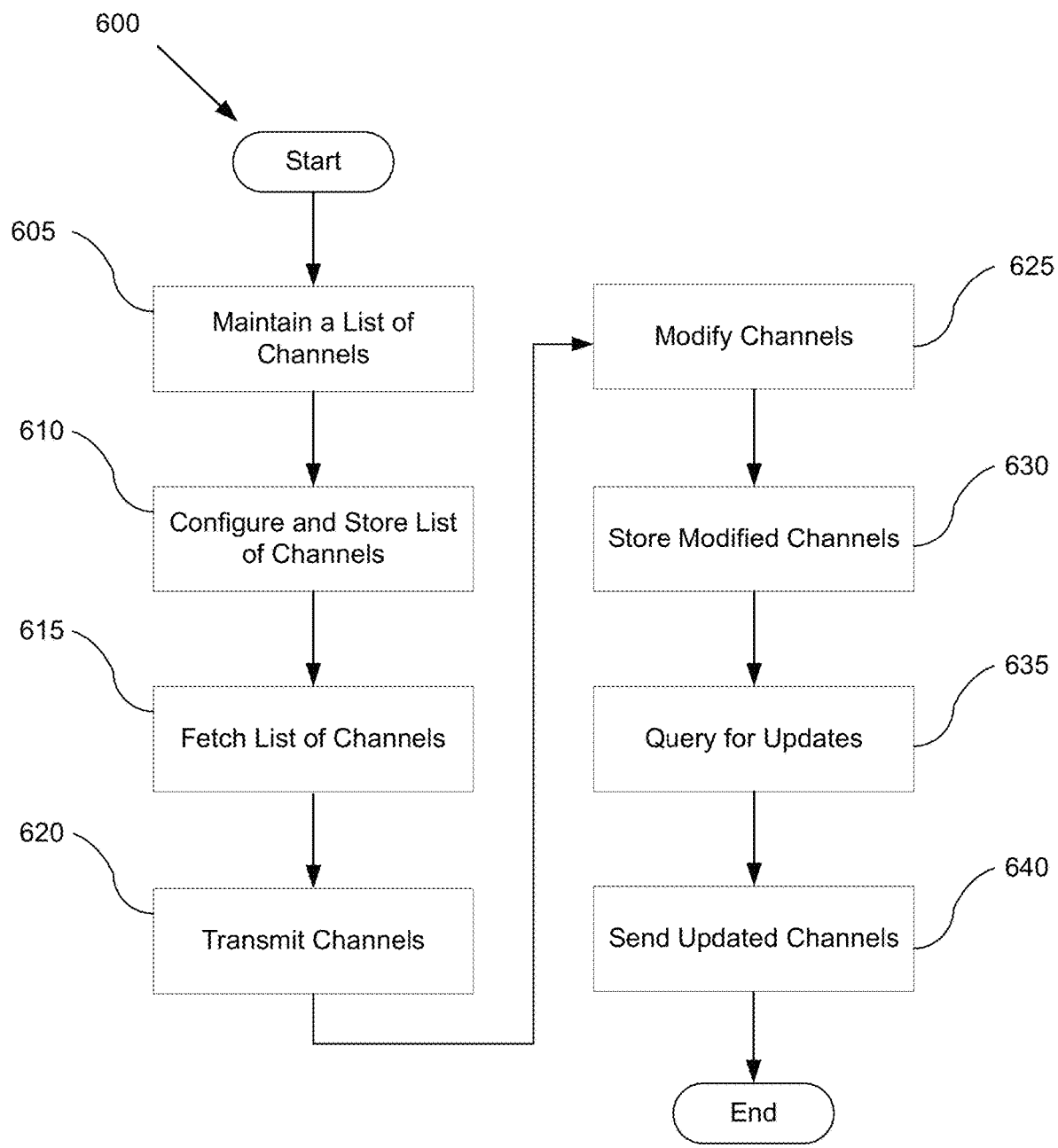
FIG. 6 is a flow diagram illustrating a process for updating one or more message channels, according to an embodiment of the present invention.

FIG. 6 is a flow diagram illustrating a process for updating one or more message channels, according to an embodiment of the present invention. In some embodiments, the process may begin with the admin accessing the dashboard to maintain the list of channels at 605. At 610, the admin configures or modifies the list of channels. Any modifications may result in the list of channels being stored in the server, for example. These modifications may include changes to the list of the channels, changes to the content within each channel, etc.

At 615, the client device fetches the list of channels, including any modifications thereto. The client device may fetch the list of channel on the initial launch of the application, for example. At 620, the server sends the channels to the client device. The client device may receive all the channels or only those channels that the client device has access to. The client device may also track the time of download for the channels, which may be used to keep the server and the client device in sync, for example.

At 625, the admin accesses the dashboard to modify the channels. The modifications may include changes to the channel name, changes to the channel description, changes to the channel icon, changes to the channel type (e.g., one-way or two-way), etc. At 630, the server stores the modifications to the channels. It should be appreciated that in certain embodiments changes to the channel list may occur when the channel itself is being modified. In other embodiments, the channel list itself may be modified without any changes to the channel itself. For example, one or more channels may be added or removed, the arrangement or order of the channels may be changes, etc., resulting in a change to the channel list. Regardless of whether the channel or the channel list is being modified, the server may store any of changes. At 630, the client device queries the server for any changes to the channels (or the channel list) since the last fetch. The client device may also transmit the last update. In some embodiments, the query may be periodically transmitted to the server or may be initiated by the user of the client device. At 635, the server sends the channel updates, and in some embodiments, channel list updates, to the client device. For example, the server may send the updated channels rather than sending all of the channels. To send only the updated channels, the server may perform a check to see which channels were transmitted during the last fetch, and based on the results, may send only those channels that have been updated since the last fetch. This way, the updates may be quickly populated on the client device.

Figure 7:
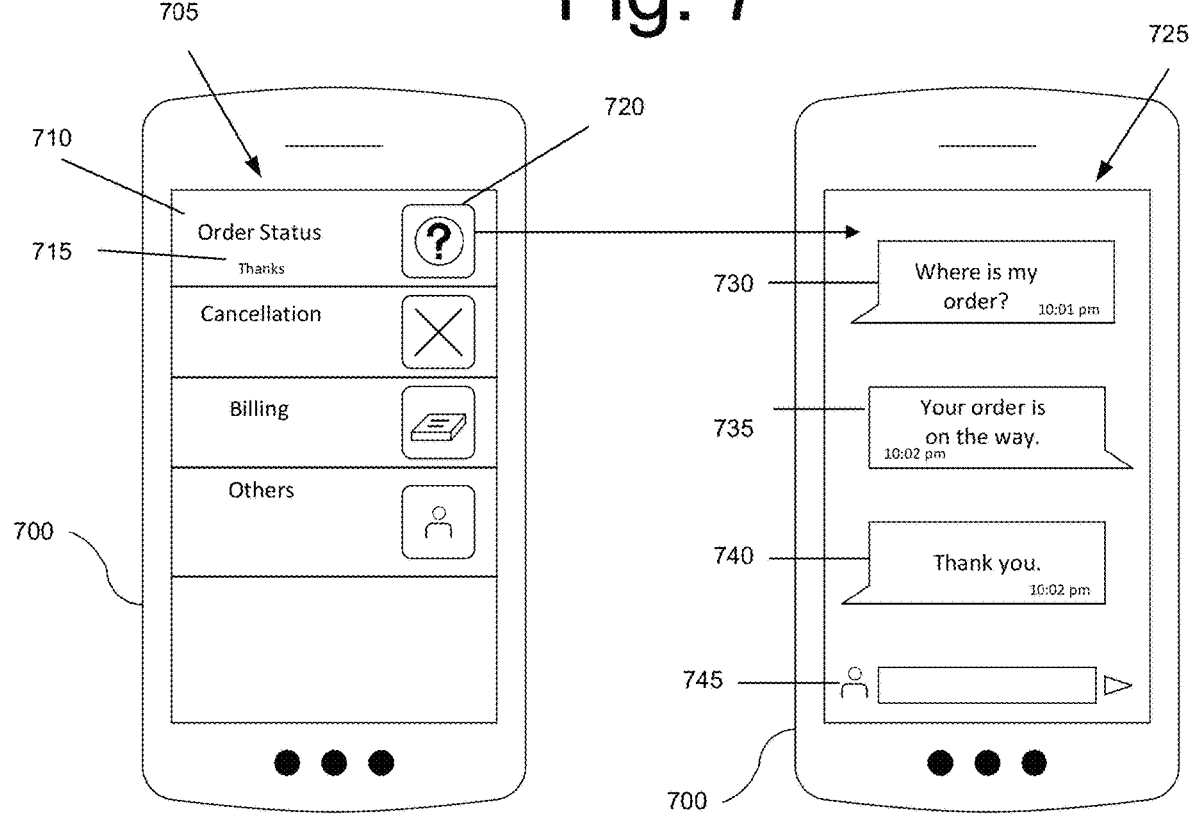
FIG. 7 is a diagram illustrating a channel list and channel message on a client device, according to an embodiment of the present invention.

FIG. 7 is a diagram illustrating a channel list 705 and channel message 725 on client device 700, according to an embodiment of the present invention. In this embodiment, channel list 705 displays an order status channel, a cancellation channel, a billing channel, and an others channel. It should be appreciated that the embodiments are not limited to the channels shown in FIG. 7, but additional channels may be presented in channel list 705.

Under each channel, a channel name 710, most recent message 715, and a channel icon or image 720 may be displayed. In some additional embodiments, a time stamp for the most recent message and/or a badge number identifying the number of unread messages may be displayed.

Once the user selects the channel, client device 700 may display the channel message (or selected channel) 725. Under the selected channel, the user message or request 730, the agent message 735 or response, the user message in reply thereto 740 may be displayed. It should be appreciated that the order of the messages are not restricted in the manner shown in FIG. 7, and may be in any order depending on the conversation between the user and the agent or BOT. Channel message 725 may also include a chat input 745 allowing the user to enter his or her message. Input may be through a keyboard displayed on client device 725 or through voice input.

Figure 8:
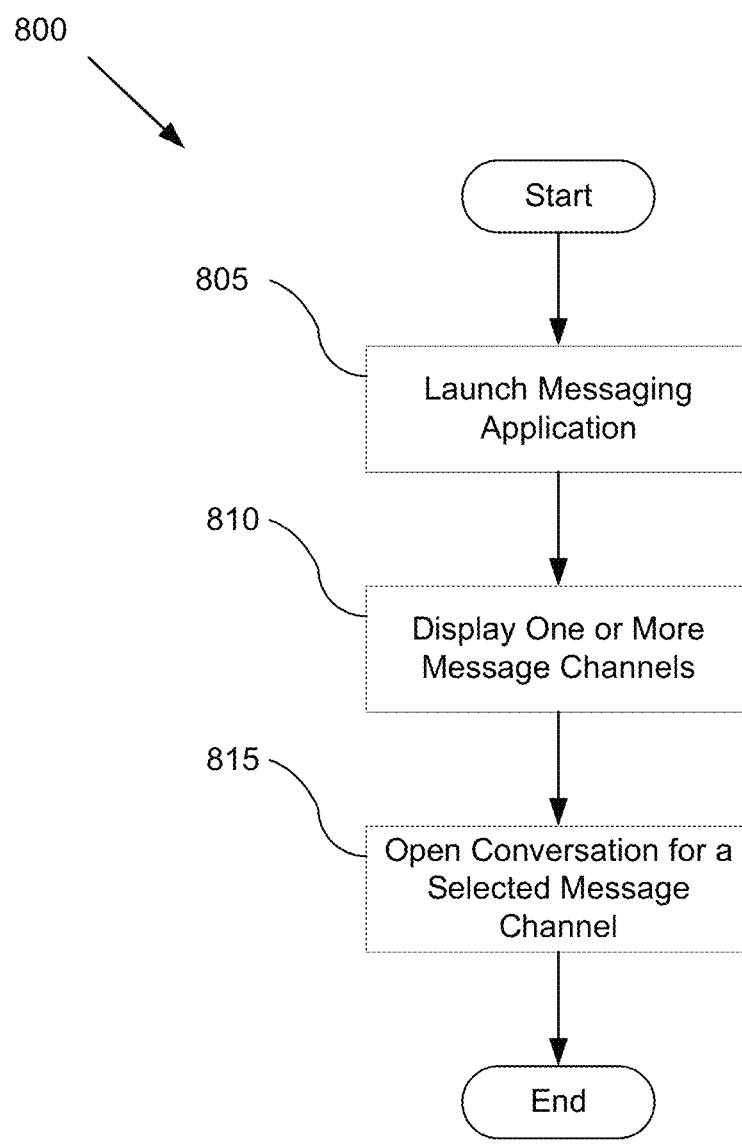
FIG. 8 is a flow diagram illustrating a process for launching message channels in an application or web-based interface, according to an embodiment of the present invention.

FIG. 8 is a flow diagram illustrating a process 800 for launching a selected message channel in an application or web-based interface, according to an embodiment of the present invention. In this embodiment, the process may begin at 805 with the user launching a messaging app, which includes a SDK for the message channel module, on the client device. In another embodiment, the user may access the message channels through a web-based interface. At 810, the client device retrieves the message channels maintained by the server, and displays the message channels for the user to see. At 815, the client device receives a message channel selection from the user, and responsive to the selection, the client device opens the selected message channel to enable communication with the agent or BOT.

Figure 9:
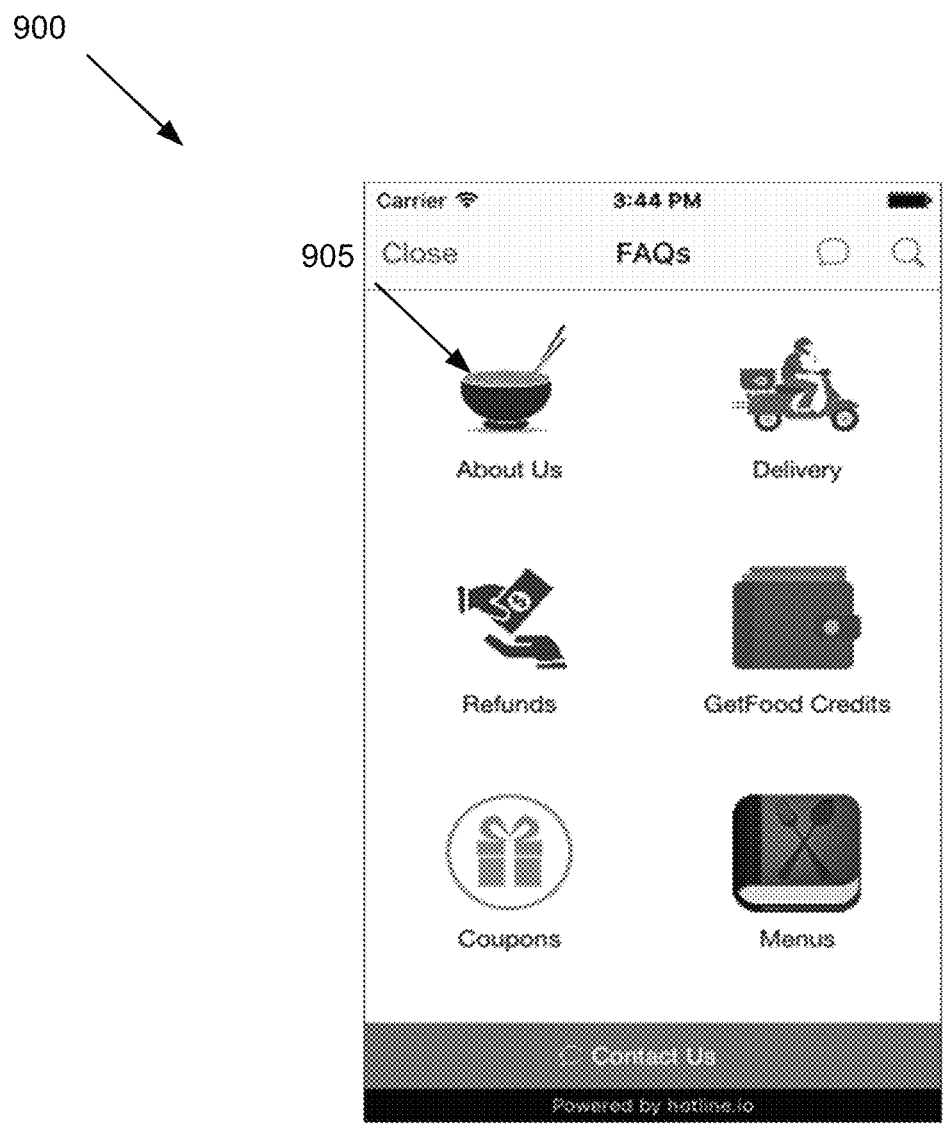
FIG. 9 is a GUI illustrating a FAQ module executed in an application or a web-based interface, according to an embodiment of the present invention.

FIG. 9 is a GUI illustrating a FAQ module 900 executed in an application or a web-based interface, according to an embodiment of the present invention. In some embodiments, when a user has a question or issue during the conversation between the user and agent, an option to select a native frequently asked question (FAQ) icon may be available for the user to select. The FAQ icon, when selected, may provide an intuitive and appealing interface for a user within the message application to find the help topic that the user is looking for. For example, in FIG. 9, FAQ module 900 is presented in a grid format to allow the user to avoid waiting for, or conversing with, an agent.

FAQ application 900 may arrange each icon for display on a user's computing device. For example, FAQ application 900 may map each top-level help topic category with an icon 905. As shown in FIG. 9, each topic icon 905 is presented in a grid view. This way, each FAQ topic is presented in a mobile friendly manner.

Although not shown, when the topic icon is selected, another grid view of sub-topic icons may be presented. In other words, there may be several levels within the grid depending on the topic icon that is selected. Otherwise, detail of the topic icon may be presented once the icon is selected.

FAQ application 900 may allow a larger number of users to receive help due to a familiar, friendly visual representation of help categories via a grid of icons than is otherwise conventionally possible. This may also increase the number of ticket deflections and reduce the cost of operation for a business. This may also further decrease the number of processes involved on the user side.

In some embodiments, the channel messages, including the messages, may be displayed in the language of where the user is geographically located. For example, if the user is in Germany, the attributes of the conversation may be displayed in German. In other embodiments, the message application may allow the user to view the conversation, including any attribute associated therewith, in the preferred language. Using the previous example, if the user is in Germany, the user has the option to view the conversation in German.

In certain embodiments, message application may dynamically determine or arrange a list of message channels depending on the properties and/or conditions. For example, based on the location of the user, the user may be provided with access to message channels meant for a particular region and/or country. In some other examples, the user may be provided with access to certain message or transaction channels based on the user's action.

As discussed above, some embodiments may include tags for each message channel. In those embodiments, tags may identify a message channel, since the message channel itself is mutable, i.e., the message channel may be enabled, disabled, and/or modified any time. By using tags to identify message channels, the tags can be transferred to an alternate channel and communication may be carried out over the new message channel, when the existing message channel is disabled. This may allow a specific message channel to be launched from certain sections of the messaging application or based on the context of the conversation. For example, a message channel may be tagged to classify the message channel as meant for complaints regarding transactions performed by the user, but have yet to be completed. This message channel may then be made available only in the section of the application which has these incomplete orders. Any message, which is subsequently sent on this message channel, will be related to the incomplete order and may be routed to the appropriate agent(s).

In certain embodiments, message channels may be dynamically created within the application itself. For example, each transaction of a user may be used as context for a separate message channel meant for concierge or support around that specific transaction (which is a message channel specific to that user).

The message application may display preauthorized (or canned) responses, FAQs, short codes to support agents, etc. based on the message channel that the user has selected. Certain embodiments may include auto-responses that have been previously setup based on the message channel that was selected.

The processes shown in FIGS. 6 and 8 may be performed, in part, by a computer program, encoding instructions for a nonlinear adaptive processor to cause at least the process described in FIG. 6 to be performed by the computing systems discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 6 and 8, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit (ASIC). Furthermore, the processes executed in FIGS. 6 and 8, for example, may improve the processing time for a computing device when connecting the user with the agent or agent group.

Some embodiments generally pertain to a messaging application that displays message channels for a user to connect with an agent or agent group. Message channels (or topics of conversation) may allow for quicker disposition and routing of the user to the agent, for example. This is a technical advantage over conventional chat-based systems at least in the sense that conventional chat-based systems use a drop down approach, which takes more time to connect the user with the agent.

Message channels may be dynamically configured, and the message channels may be added via a backend interface, such that the message channels can be updated remotely on the user's computing device. Message channels may further allow conversations to be user-initiated and/or business-initiated. For example, when the user attempts an unsuccessful transaction, the business may identify the unsuccessful transaction, and provide the user with a prompt, allowing the user to connect with the support agent to resolve the problem. Alternatively, the business may initiate messaging with the user and help resolve the issue directly.

Message channels may allow for a more natural and familiar user interface, enhancing the user's experience. Message channels increase the user's ability to navigate to the appropriate channel to resolve his or her issue, and allow the user to be routed to be correct group of agents. Message channels may prioritize conversations, and may improve auto responses and bots due to clear disposition from the user. Message channels also set user expectations, e.g., when to expect responses, how the user will be engaged, etc.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiments," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented process for managing message channels, comprising:
   receiving, at a server, a list of message channels from a dashboard of an admin device;
   associating, at the server, each message channel in the list of message channels with a corresponding tag, the corresponding tag is configured to filter a message channel changing visibility of the message channel on the one or more client devices and is hidden from use of the one or more client devices;
   pushing, from the server, the list of message channels to one or more client devices in response to a query from the one or more client devices;
   receiving, at the server, a broadcast message created from the dashboard of the admin, the broadcast message is associated with a particular channel, wherein each message channel has an associated context comprising at least one of use of an application, a type of user, and category of tag assigned to the user and application;
   identifying one or more users associated under the particular channel, wherein the one or more messages are associated with user criteria associated with rules comprising at least one of usage criteria, application and/or device criteria, and custom properties; and
   sending a message comprising the broadcast message to a broadcast server causing the broadcast server to send the broadcast message to a device of the one or more identified users the broadcast message associated with the particular channel, wherein
   the list of message channels identifies one or more topics for the user of the one or more client devices to select in order to connect with an agent or a BOT,
   each message channel being mutable facilitates each message channel being enabled, disabled, and/or modified at any time, and
   the corresponding tag being transferrable to an alternate channel, increasing routing of one or more messages to an appropriate agent and allowing communication to be carried out over the alternate channel.

2. The computer-implemented process of claim 1, further comprising:
   receiving, at the server, modifications to one or more message channels, to the list of message channels, or both, the modifications are received from the dashboard accessed by the admin device; and pushing, from the server, the modifications of the one or more message channels, of the list of message channels, or both, to one or more client devices.

3. The computer-implemented process of claim 2, further comprising:
initially assigning, by the server, a message for a selected channel to a BOT for communication between a client device and the BOT, wherein the message for the selected channel is initiated by a user of the client device.

4. The computer-implemented process of claim 3, further comprising:
receiving a reassignment notification of the message from the BOT to an agent, when the BOT is unable to respond to the user of the client device, wherein
the reassignment notification allows server to redirect communication from the user of the client device to the agent and from the agent to the user of the client device.

5. The computer-implemented process of claim 1, further comprising:
pushing, from the server, to the one or more client device updates to the list of message channels, to the one or more channels, or both, after a predefined period of time.

6. The computer-implemented process of claim 1, further comprising:
receiving, at the server, a broadcast message created from the dashboard of the admin, the broadcast message is associated with a particular channel;
identifying one or more users associated under the particular channel; and
sending a message comprising the broadcast message to a broadcast server causing the broadcast server to send the broadcast message to a device of the one or more identified users the broadcast message associated with the particular channel.

7. The computer-implemented process of claim 1, further comprising:
storing, at the server, a broadcast message created from the dashboard of the admin, the broadcast message being created for a particular channel;
receiving, at the server, a request for channel updates from the one or more client devices; and
transmitting, from the server, to the one or more client devices the broadcast message in response to receiving the request.

8. The computer-implemented process of claim 1, further comprising:
storing, by the server, one or more tags associated with the one or more message channels, wherein the one or more tags are predefined or redefined by an admin; and
pushing the one or more tags to the one or more client devices filtering the one or more channels in a particular application executed on a client device.

9. An apparatus configured to manage managing message channels, comprising:
memory comprising a set of instructions; and
at least one processor, wherein
the set of instructions, with the at least one processor, is configured to cause the apparatus to
receive a list of message channels from a dashboard of an admin device;
associate each message channel in the list of message channels with a corresponding tag, the corresponding tag is configured to filter a message channel changing visibility of the message channel on the one or more client devices and is hidden from use of the one or more client devices;
push the list of message channels to one or more client devices in response to a query from the one or more client devices;
receive a broadcast message created from the dashboard of the admin, the broadcast message is associated with a particular channel, wherein each message channel has an associated context comprising at least one of use of an application, a type of user, and category of tag assigned to the user and application;
identify one or more users associated under the particular channel, wherein the one or more messages are associated with user criteria associated with rules comprising at least one of usage criteria, application and/or device criteria, and custom properties; and
send a message comprising the broadcast message to a broadcast server causing the broadcast server to send the broadcast message to a device of the one or more identified users the broadcast message associated with the particular channel, wherein
the list of message channels identifies one or more topics for the user of the one or more client devices to select in order to connect with an agent or a BOT,
each message channel being mutable facilitates each message channel being enabled, disabled, and/or modified at any time, and
the corresponding tag being transferrable to an alternate channel, increasing routing of one or more messages to an appropriate agent and allowing communication to be carried out over the alternate channel.

10. The apparatus of claim 9, the set of instructions, with the at least one processor, is further configured to cause the apparatus to
receive modifications to one or more message channels, to the list of message channels, or both, the modifications are received from the dashboard accessed by the admin device; and
push the modifications of the one or more message channels, of the list of message channels, or both, to one or more client devices.

11. The apparatus of claim 10, the set of instructions, with the at least one processor, is further configured to cause the apparatus to
initially assign a message for a selected channel to a BOT for communication between a client device and the BOT, wherein the message for the selected channel is initiated by a user of the client device.

12. The apparatus of claim 11, the set of instructions, with the at least one processor, is further configured to cause the apparatus to
receive a reassignment notification of the message from the BOT to an agent, when the BOT is unable to respond to the user of the client device, wherein
the reassignment notification allows server to redirect communication from the user of the client device to the agent and from the agent to the user of the client device.

13. The apparatus of claim 9, the set of instructions, with the at least one processor, is further configured to cause the apparatus to
push to the one or more client device updates to the list of message channels, to the one or more channels, or both, after a predefined period of time.

14. The apparatus of claim 9, the set of instructions, with the at least one processor, is further configured to cause the apparatus to receive a broadcast message created from the dashboard of the admin, the broadcast message is associated with a particular channel;

identify one or more users associated under the particular channel; and send a message comprising the broadcast message to a broadcast server causing the broadcast server to send the broadcast message to a device of the one or more identified users the broadcast message associated with the particular channel.

15. The apparatus of claim 9, the set of instructions, with the at least one processor, is further configured to cause the apparatus to store a broadcast message created from the dashboard of the admin, the broadcast message being created for a particular channel;

receive a request for channel updates from the one or more client devices; and transmit to the one or more client devices the broadcast message in response to receiving the request.

16. The apparatus of claim 9, the set of instructions, with the at least one processor, is further configured to cause the apparatus to store one or more tags associated with the one or more message channels, wherein the one or more tags are predefined or redefined by an admin; and push the one or more tags to the one or more client devices to filter the one or more channels in a particular application executed on a client device.

* * * * *